(12) United States Patent
Lindqvist et al.

(10) Patent No.: US 7,221,959 B2
(45) Date of Patent: May 22, 2007

(54) SYSTEM AND METHOD FOR DETERMINING, STORING AND UTILIZING OPERATING MODE DATA OF A USER TELECOMMUNICATION TERMINAL

(75) Inventors: Anssi Lindqvist, Helsinki (FI); Sami Pippuri, Helsinki (FI); Petri Pohjanen, Oulu (FI); Hannu Rönkkö, Espoo (FI); Pasi Ketonen, Veikkola (FI)

(73) Assignee: TeliaSonera Finland Oyj, Helsinki (FI)

( * ) Notice: Subject to any disclaimer, the term of this patent is extended or adjusted under 35 U.S.C. 154(b) by 4 days.

(21) Appl. No.: 10/686,414

(22) Filed: Oct. 14, 2003

(65) Prior Publication Data

US 2004/0110502 A1 Jun. 10, 2004

Related U.S. Application Data

(63) Continuation of application No. PCT/FI02/00298, filed on Apr. 9, 2002.

(30) Foreign Application Priority Data

Apr. 11, 2001 (FI) .................................. 20010768

(51) Int. Cl.
*H04M 1/00* (2006.01)
*H04Q 7/38* (2006.01)
*H04Q 7/20* (2006.01)

(52) U.S. Cl. ............................... 455/552.1; 455/414.1; 455/466

(58) Field of Classification Search ............. 455/552.1, 455/553.1, 456.1, 414.1, 414.3, 550.1
See application file for complete search history.

(56) References Cited

U.S. PATENT DOCUMENTS

| | | | |
|---|---|---|---|
| 5,493,611 A * | 2/1996 | Hubert | 379/387.01 |
| 6,115,620 A * | 9/2000 | Colonna et al. | 455/569.1 |
| 6,389,288 B1 * | 5/2002 | Kuwahara et al. | 455/456.6 |
| 6,625,451 B1 * | 9/2003 | La Medica et al. | 455/434 |
| 6,671,508 B1 | 12/2003 | Mitsuoka et al. | |
| 6,711,146 B2 * | 3/2004 | Yegoshin | 370/338 |
| 6,728,530 B1 * | 4/2004 | Heinonen et al. | 455/414.1 |
| 6,748,295 B2 * | 6/2004 | Tilles et al. | 700/241 |
| 6,865,384 B2 * | 3/2005 | Sagi et al. | 455/412.1 |
| 7,027,801 B1 * | 4/2006 | Hall et al. | 455/412.1 |

FOREIGN PATENT DOCUMENTS

| | | |
|---|---|---|
| EP | 0 781 067 A2 | 6/1997 |
| EP | 1 047 253 A2 | 10/2000 |
| EP | 1 071 295 | 1/2001 |
| EP | 1 098 489 | 5/2001 |
| EP | 1 098 489 A2 | 5/2001 |
| JP | 2000-32119 | 1/2000 |

(Continued)

*Primary Examiner*—Tilahun Gesesse
(74) *Attorney, Agent, or Firm*—Cohen Pontani Lieberman & Pavane LLP

(57) ABSTRACT

A system and method for determining, storing and utilizing terminal operating mode data in a telecommunication system, in which the user can selectively set his terminal into two or more distinct operating modes. When the operating mode of the user's terminal is changed, information regarding the change of operating mode is sent from the user terminal to a telecommunication server using any available and/or otherwise available technique available in the telecommunication network. The user terminal operating mode change is stored on the telecommunication server for access by parties seeking to contact or communicate with the user's terminal.

26 Claims, 4 Drawing Sheets

FOREIGN PATENT DOCUMENTS

| | | |
|---|---|---|
| JP | 2000-286950 | 10/2000 |
| JP | 2000-287249 | 10/2000 |
| JP | 2001-78272 | 3/2001 |
| JP | 2001-204055 | 7/2001 |
| WO | WO 99/27722 | 6/1999 |
| WO | WO 00/18166 | 3/2000 |

\* cited by examiner

SYSTEM AND METHOD FOR DETERMINING, STORING AND UTILIZING OPERATING MODE DATA OF A USER TELECOMMUNICATION TERMINAL

CROSS-REFERENCE TO RELATED APPLICATION

This is a continuation of International Application No. PCT/FI02/00298, filed Apr. 9, 2002.

BACKGROUND OF THE INVENTION

1. Field of the Invention

The present invention relates to telecommunication technology, and is more particularly directed to systems and methods for the determination, storage and use of operating mode data for a user terminal in a telecommunication system.

2. Description of the Related Art

Users of telecommunication terminals in telecommunication networks, and particularly in mobile communication networks, are virtually always reachable. The current or active operating mode of a mobile station can be selectively changed in a variety of ways, such as through the use of so-called profiles. If the user of a terminal is occupied, as for example when attending an important meeting, the user may for example selectively activate or enable a predefined "meeting" profile in which the mobile station is placed in a silent operating mode and will only notify the user of an incoming call from specific predetermined numbers. The profiles associated with a particular mobile station or terminal are generally defined, selected, and activated by the user of the terminal by means of the terminal itself.

In the system of published International Application WO 00/42784 (Peltola et. al.), the user can change the state (i.e. active/passive) of his or her communication line by separately contacting the network and so instructing a predetermined server.

Published International Application WO 97/41654 (Tsoukas et. al.) discloses a system in which a customer profile associated with the user/customer is stored in a database provided in the telecommunication network. The customer profile may contain a variety of service requests as a function of time and/or location. The data stored in the customer profile are of a triggering nature; the customer can thus define various schedule conditions and limits, e.g. for stock prices. When the conditions thus set are met, the server automatically sends to the customer's terminal a corresponding message, as for example in the form of an SMS (Short Message Service) short message commonly used in mobile communication networks The system disclosed in published International Application WO 97/41654 accommodates the provision of advertising or services in accordance with the defined profile or location data. This system does not however allow the focus of advertising or services to be dependently applied based on the actual state of the terminal; rather, services are applied based only on information that has been prestored in the profile.

In a telecommunication network, such as a mobile communication network, a reachability management system can be implemented. The user can set up his or her own profile in the reachability management system and elect to define a reachability chain; the reachability chain that is to be used at any given time is identified on the basis of rules stored in the profile. The user can also manually enable or activate a particular reachability chain by sending a specific message to the reachability management system.

Applications contained in terminals, as for example mobile stations and PDA (Personal Digital Assistant) devices, are of a static nature in that such applications are unchangeable. Mobile stations provide fairly limited capabilities for modifying the properties of the mobile station; available modifications are primarily based on or limited to user profiles as discussed hereinabove. In practice, a user can change the type of ring-tone of the mobile station to suit the time and place, but there is no opportunity to adapt the variety of applications contained in the terminal to current circumstances or situations by changing the particular applications in use, the user interface or the operating environment.

It is known to base the transmission or provision of advertisements and services to a terminal on location data or time-based definitions. In a telecommunication network, it is possible to define a user profile on the basis of which advertisements or other services are sent to the user. The profile can for example define certain times of the day at which desired information may be transmitted to the user's terminal. However, these functionalities do not take into account the actual or current active state of the terminal.

One currently-existing problem is the inability of a party trying to reach a B-subscriber to determine whether the B-subscriber is able to receive a connection set-up request, an advertisement or a service. Thus, the party (the A-subscriber) wishing to contact a terminal user (the B-subscriber) has no ability to learn or identify the present state or status of the terminal of the B-subscriber.

OBJECTS AND SUMMARY OF THE INVENTION

It is accordingly the desideratum of the present invention to eliminate, or at least significantly alleviate, the drawbacks and deficiencies of prior art methods and systems, such for example as those described hereinabove.

It is a particular object of the invention to provide a novel method and system that will permit versatile use of operating mode data of a user's terminal.

The present invention accordingly provides a method for determining, storing and utilizing terminal operating mode data in a telecommunication system and in which the user can selectively set his or her terminal into each of two or more operating modes. The terminal is preferably a mobile station, although the inventive method can also be applied to other types of communication devices and terminals. In accordance with the invention, the operating mode of the terminal is selectively changed by the user and, as a consequence of that change, the terminal sends information regarding the change of operating mode to a telecommunication server using a normally-available practice or procedure of the telecommunication network, as for example by way of an SMS or WAP (Wireless Application Protocol) message. The telecommunication server saves or stores the updated operating mode data from the terminal.

The information regarding the change of operating mode of the terminal is sent to the telecommunication server either automatically, i.e. without any other action by the user, or in the alternative manually by the user. The telecommunication server saves or stores the updated operating mode data from the terminal and, in addition, stores user-specific data which may for example include the identity of the user and/or terminal, a terminal through which the user can be reached at different times, terminal setting data for reaching the user, the type of telecommunication connection available for reaching the user, the IP (Internet Protocol) address of the terminal, and terminal location data.

The terminal operating mode data on the telecommunication server are not necessarily automatically public, but can at the option of the user be transmitted to other parties. Operating mode data visible to other users can furthermore be divided into different visibility areas or levels so that, by way of example, the operating mode data is viewable by different parties with different levels or degrees of detail or accuracy.

In an embodiment of the invention, a connection is to be established to a user's terminal. The party wishing to establish contact with the user checks the current operating mode data browsable by other users to determine the operating mode of the terminal and, after performing this check of the current or active operating mode, makes a decision as to whether to establish a connection to the user's terminal.

In a modification of the inventive method, based on the received operating mode data, information relating to the terminal's operating environment is sent to the terminal and the operating environment of the terminal is modified for consistency with the operating mode change information. As used herein, the term "operating environment" refers by way of illustrative example to applications contained in the terminal and to the user interface of the terminal. Thus, the applications contained in the terminal and its operating environment are modified in accordance with the current operating profile of the terminal. The required applications and information regarding the changes are loaded into the terminal via the telecommunication network.

In one contemplated implementation of the invention, the terminal operating mode data may be used for directing advertising and/or services to the terminal.

In another implementation of the inventive method, identity data identifying the user and/or the terminal is sent to the telecommunication server in or with the transmission of operating mode data and, based on that identity data, the reachability chain associated with user reachability management is altered in the telecommunication server for consistency with the received operating mode of the terminal. Accordingly, when the user makes a change in the operating profile of his or her terminal, information regarding the change of operating mode is transmitted to the reachability management system of the telecommunication server, and call control is modified for consistency with the reachability chain. A user-specific reachability profile contained in the management system defines which reachability chain is to be used with each operating mode. Changes in the user-specific reachability profile can be made in any suitable manner, as via a WWW (World Wide Web) user interface.

The present invention is additionally directed to a system for determining, storing and utilizing terminal operating mode data in a telecommunication system that includes a telecommunication network, a user terminal connected to the telecommunication network, and a telecommunication server for maintaining the active operating mode data for the user terminal.

In implementing the inventive system, embodiments incorporating one or more additional features and/or elements are contemplated. For example, one or more memorandums containing information about one or more users and/or terminals can be provided.

The inventive system may include an application server for the storage of settings regarding the applications and the operations associated with different operating modes, and for transmission to the user terminal of required settings for the applications and operations.

The telecommunication server may include one or more user-specific reachability profiles in which a reachability chain is defined.

The inventive system may include a call control system connected to the telecommunication server and controlling call setup in accordance with a selected reachability chain. The call control system may be implemented as an intelligent network (IN).

In various embodiments of the inventive system, the terminal is by way of preferred example a mobile station.

The present invention enables an A-subscriber wishing to establish a connection with a B-subscriber to first check the operating mode of the B-subscriber's terminal, and to only then decide whether to establish the connection. The invention further permits the operating environment of the user terminal and the applications it contains to be determined on the basis of the then-valid or active operating profile. These abilities provide enhanced functionality in that, by way of illustrative example, the user terminal may contain different applications during working hours than during the user's leisure time.

The present invention additionally enables advertising and services sent or applied to the user's terminal to be directed to or displayed by the terminal in accordance with current mode data relating to the user and/or the user terminal.

The present invention still further allows an operating mode selection made by a user via the user's terminal to be employed in the control of a reachability management system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE CURRENTLY PREFERRED EMBODIMENTS

Figure 1:
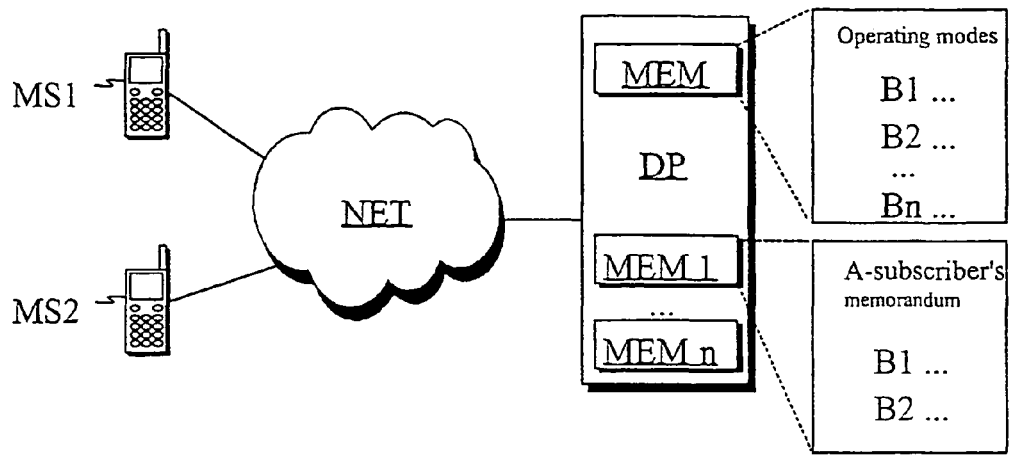
FIG. 1 diagrammatically depicts a system in accordance with the present invention.

The system of the invention shown in FIG. 1 includes user terminals MS1 and MS2 which, in preferred forms of the system, are mobile stations. The mobile stations are connected to a telecommunication network NET, which is preferably a mobile communication network. Connected to the mobile communication network NET is a telecommunication server DP which is operative to maintain information relating to the mobile stations that use it and, in particular, to monitor the active operating mode of each such mobile station. In this illustrative description of the system embodiment of FIG. 1, the term "operating mode" refers to the operating profile of the mobile station, such for example as "At work", or "Having lunch", or "At leisure". The telecommunication server DP includes a memorandum MEM in which the operating modes of the mobile stations using the server DP are stored. Additional information regarding each terminal that can be stored in the memorandum MEM includes, by way of example, the identity of the user and/or the terminal, the type of terminal via which the user is reachable at any particular time, and/or terminal setting data for reaching the user. The memorandum MEM may additionally contain information indicating the type of telecommunication connection over which a user can be reached via the user's terminal, the IP address of the terminal, and/or location data for the terminal. Telecommunication server DP may in preferred forms of the inventive system be implemented in or by a server computer provided with the hardware and/or software-based applications needed or appropriate for achieving the functionalities provided by the present invention as herein described.

Figure 5:
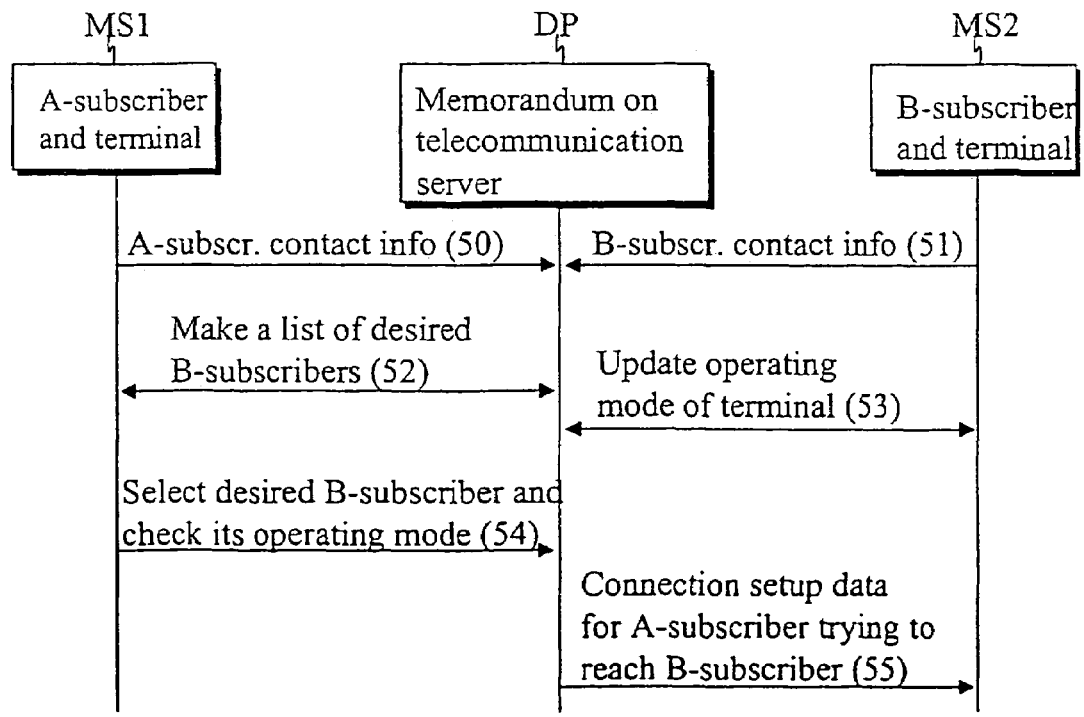
FIG. 5 is a signal flow diagram depicting operation of the system of FIG. 1.

FIG. 5 further shows by way of a signal flow diagram the operation of the system of FIG. 1. The connection between an A-subscriber (the calling subscriber) and a B-subscriber (the called subscriber) is set up via the telecommunication server DP. When desired, the A-subscriber and/or the B-subscriber update their own contact information (arrows 50 and 51) in the telephone memorandum MEM maintained in the telecommunication network. The A-subscriber can additionally maintain a second memorandum MEM1 (see FIG. 1) of information about B-subscribers known to him (arrow 52). The second memorandum MEM1 is by way of illustration used for the storage of all contact information concerning known or acceptable or otherwise predetermined B-subscribers, such as their telephone numbers, IP addresses, first names, etc., as arranged and selected by the A-subscriber.

The activity of the memorandum MEM is based on functionality by which the memorandum MEM monitors the operating mode of the terminal of each user utilizing the same, by employing the techniques and processes of the telecommunication network available in each case. The memorandum MEM monitors the state of reachability of the terminal used by the B-subscriber and its level of communication, either automatically or under user control (arrow 53). By way of illustrative example, in this instance the memorandum MEM is assumed to contain, in addition to contact information regarding the user, data indicating which terminal can be used to reach the user at the present time. Also stored in the memorandum MEM is information providing the current settings in the user's terminal for reaching the user. The memorandum MEM may further store information indicating the quality of telecommunication network coverage of the user at any given time and the user's current location.

When the A-subscriber wishes to establish a connection with a B-subscriber, the A-subscriber first sets up a connection, via a terminal employed by the user, to the second memorandum MEM1 on the telecommunication server DP, where he can browse the operating mode data of desired B-subscribers (arrow 54). In the particular embodiment depicted in FIG. 1, the memorandum MEM and the second memorandum MEM1 are located on the same telecommunication server DP, although this arrangement is illustrative in nature. Thus, by way of alternative example, the second memorandum MEM1 of the A-subscriber may be placed on a different telecommunication server which, using client-server type connection software, fetches information concerning the operating mode of desired B-subscribers into the second memorandum MEM1. The information in the second memorandum MEM1 can then be updated automatically, as for example at specific intervals or when predetermined criteria have been met concerning the state of the telecommunication network. The data may by way of illustration be updated when the user's terminal supports telecommunication networks of different types and its data transmission function is transferred from a GSM (Global System for Mobile communications) network to a WLAN (Wireless Local Area Network) or a Bluetooth network. Alternatively, the A-subscriber may, using an application in the user's terminal, load the operating mode data associated with B-subscribers into the memory of the terminal, from which the A-subscriber can thereafter select a desired person to be called. Where an accelerometer is installed in the B-subscriber's terminal, information indicating whether the terminal specified by the B-subscriber is currently in use can be transmitted to the A-subscriber's terminal. In addition, after connection setup the accelerometer can provide the A-subscriber with information as to where, three-dimensionally, the B-subscriber is then located.

The A-subscriber can accordingly determine, from the operating mode data for a desired B-subscriber and prior to actually initiating setup of a call connection, whether or not the B-subscriber is reachable. If so, the A-subscriber can then proceed to establish a connection with the B-subscriber using an application in the A-subscriber's terminal via a telephone memorandum provided in the telecommunication network. In implementing call setup, the B-subscriber receives information regarding the A-subscriber that is attempting to establish a connection with the B-subscriber (arrow 55). This information may for example include the A-subscriber's name, picture, ring-tone, URL address, etc., and the B-subscriber can also be provided in call setup with information regarding the current state of the A-subscriber that is seeking to establish contact. In addition, the B-subscriber's terminal can during the connection collect information as to which other persons included in the memorandum MEM1 of the A-subscriber are located in the vicinity of the B-subscriber; this information can by way of example be collected using a Bluetooth link, with the information transmitted to the A-subscriber via the telecommunication server DP.

Figure 2:
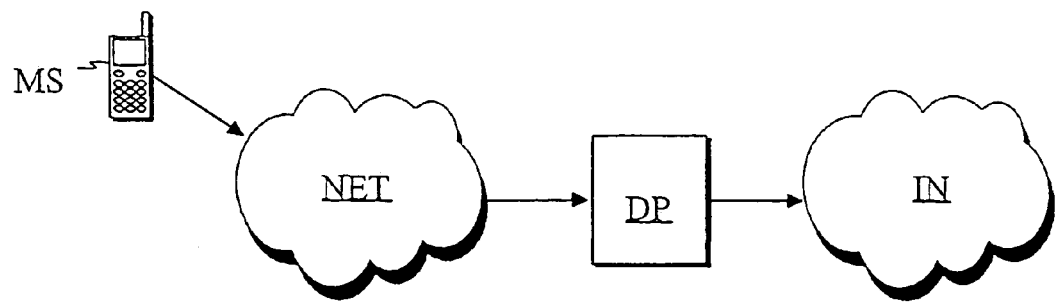
FIG. 2 diagrammatically depicts another system in accordance with the invention.

The system depicted in FIG. 2 includes a terminal MS, which is preferably a mobile station, that is connected to a telecommunication network NET which is preferably a mobile communication network. A telecommunication server DP is connected to the mobile communication network NET and is provided with a reachability management system. The reachability management system additionally contains a database for the storage of definition data associated with user reachability. A connection is provided from telecommunication server DP—which in preferred forms of the invention comprises a server computer provided with those hardware and/or software-based applications needed to provide the functionalities of the invention as herein described—to an intelligent network IN. Operation of the system of FIG. 2 is further shown by the signal flow diagram of FIG. 6.

When the user changes his or her active operating profile in the user's mobile telephone, an SMS or WAP message or other notification or communication or data transfer mechanism reporting the change is transmitted to the telecommunication server DP (arrow 60). Data relating to the operating mode update can be sent to the telecommunication server DP automatically, i.e. without any other user action when the terminal operating mode is changed, or can alternatively be sent manually by the user. The term "operating mode" in this regard refers by way of illustrative example to the operating profile of a mobile station, such as "At work", or "Having lunch", or "At leisure".

The reachability management system modifies the user's reachability in accordance with a reachability profile associated with the user's mobile telephone (arrow 61). The user can for example enter definitions, as via a WWW user interface, as to that mobile telephone profile with which a change in the reachability chain is to be associated, and as to how the profile should be changed. Identity data relating to the user and the name of the profile are transmitted in a message sent by the user. The call control system alters the control of personal reachability in real time in accordance with the defined reachability chain; with a change in the reachability chain, call control is modified in the intelligent network IN (arrow 62). It will be appreciated that although the signaling sequence of FIG. 6 represents an actual call control implementation utilizing an intelligent network, other call control implementations may alternatively or otherwise be used within the intended scope and contemplation of the invention.

Figure 3:
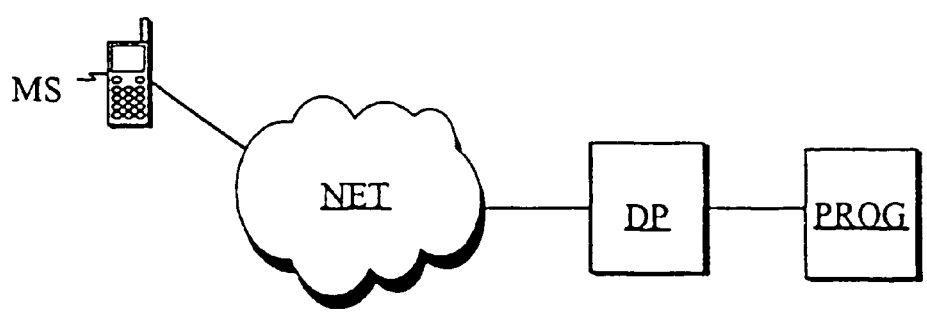
FIG. 3 diagrammatically depicts still another system in accordance with the invention.

The further alternate inventive system depicted in FIG. 3 includes a terminal MS, preferably a mobile station, that is connected to a telecommunication network NET which is preferably a mobile communication network. A telecommunication server DP is connected to the mobile communication network NET and is operable to monitor the currently active operating mode of the terminal. The term "operating mode" here preferably refers to an operating profile, which may by way of illustration be "At work", or "Having lunch", or "At leisure". The telecommunication server DP is further connected to an application server PROG. The term "telecommunication server" is intended to preferably denote a server computer provided with those applications necessary for achieving the functionalities of the invention as herein described. The operation of the system of FIG. 3 is detailed in the signal flow diagram of FIG. 7.

Figure 7:
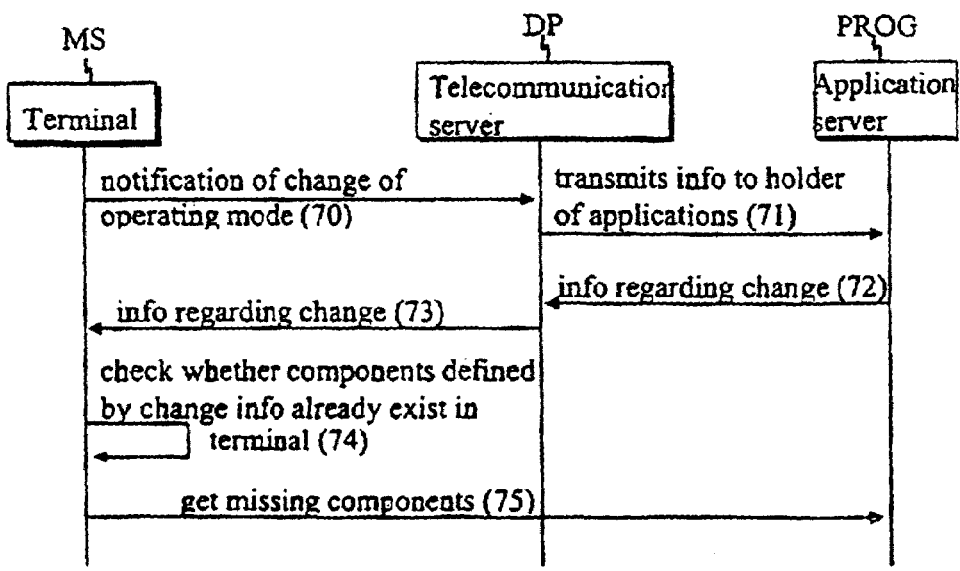
FIG. 7 is a signal flow diagram depicting operation of the system of FIG. 3.

The system and method of FIGS. 3 and 7 illustrate how the management of applications in the user terminal can be tied to current location and situation or status. When the operating mode of the user terminal changes, it sends information regarding the change of operating mode to the telecommunication server DP (arrow 70). The change of operating mode is transmitted to the telecommunication server DP either automatically, i.e. without any action on the user's part, or manually by the user. The telecommunication server DP transmits the change of operating mode to the application server PROG (arrow 71). Based on the information it has received, the application server PROG determines what modifications are to be made in the user's terminal, and then sends the modification information to the telecommunication server DP (arrow 72), which in turn transmits it further to the user's terminal MS (arrow 73). The user's terminal MS checks as to whether the components defined by the modification information already exist in the terminal (arrow 74); if not, then the terminal MS will fetch the missing components from the application server PROG (arrow 75).

Figure 6:
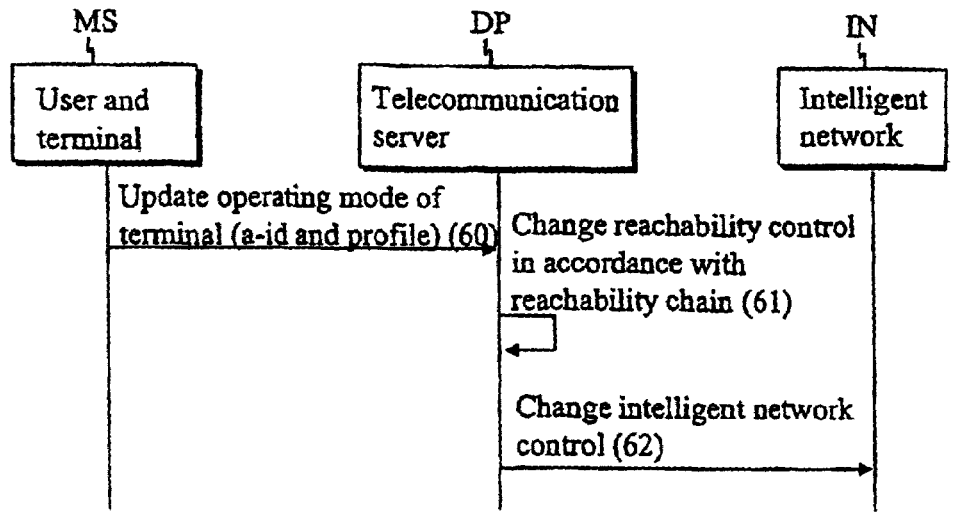
FIG. 6 is a signal flow diagram depicting operation of the system of FIG. 2.

The system and method of FIGS. 3 and 6 thus enables modification of the variety of applications in the terminal for consistency with the current operating profile. If the current operating profile of the terminal is for example "At work", then the variety of applications available to the user of the terminal and/or the terminal's user interface are/is different than when the operating profile is for example "At leisure".

Figure 4:
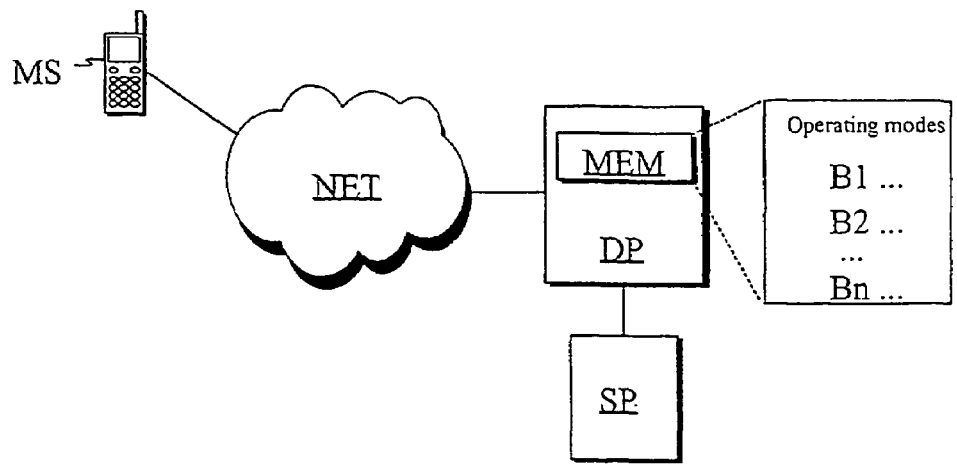
FIG. 4 diagrammatically depicts yet another system in accordance with the invention.

The further modified system depicted in FIG. 4 similarly includes a terminal MS, preferably a mobile station, that is connected to a telecommunication network NET, which is preferably a mobile communication network. A telecommunication server DP is connected to the mobile communication network NET and is operable to maintain information regarding the mobile stations that use the server DP and, in particular, to monitor the active operating mode of each such mobile station. In the illustrative embodiment of FIG. 4, the term "operating mode" denotes a mobile station operating profile, such for example as "At work", or "Having lunch", or "At leisure". The telecommunication server DP includes or comprises a memorandum MEM in which are stored the operating modes of the mobile stations using the server DP. The memorandum MEM can also store, by way of example, the identity of the user and/or the terminal, the type of terminal via which the user is reachable at any particular time, and/or terminal setting data for reaching the user, and it may also contain information indicating the type of telecommunication connection over which the user can be reached via the user's terminal, the IP address of the terminal, and/or location data for the terminal. One or more service providers SP may establish a connection with the telecommunication server DP which, in preferred implementations of the FIG. 4 system, comprises a server computer provided with those applications needed to achieve the functionalities provided by the invention as herein described. The operation of the system of FIG. 4 is detailed in the signal flow diagram of FIG. 8.

Figure 8:
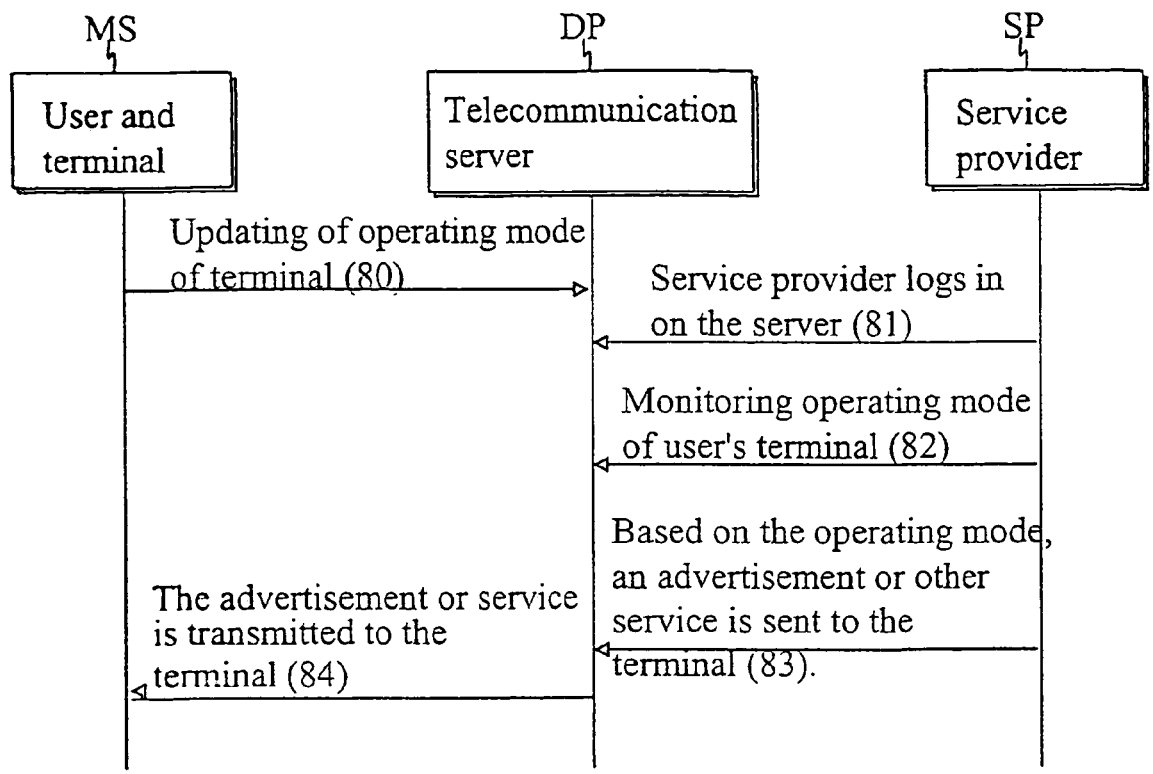
FIG. 8 is a signal flow diagram depicting operation of the system of FIG. 4.

The following describes, by way of illustrative example and reference to FIG. 8, how the operating mode data of the mobile station can be utilized for directing advertising and services to the user's mobile station. When the operating mode of the mobile station is changed, the mobile station sends a notice of or regarding the change of terminal operating mode to the telecommunication server DP (arrow 80). This change of operating mode data can be transmitted to the telecommunication server DP either automatically, i.e. without any other action on the user's part, or manually by the user. The user may also grant other parties permission to utilize the operating mode data that the user has transmitted. A service provider SP utilizing the operating mode data may log into the telecommunication server DP and monitor changes of the user's operating mode if the user has granted permission for such monitoring (arrows 81 and 82). Alternatively, operating mode data for a user terminal can be automatically transmitted, whenever the telecommunication server DP is notified of a change of operating mode, to one or more predetermined service providers or other users that have been authorized by the user to receive such information.

The operating mode data to be sent to or viewable by outside parties can be divided into multiple visibility levels or areas, thus allowing a user's mobile station operating mode to be shown to different parties with different levels or degrees of detail or accuracy. Thus, all service providers may not necessarily receive or be able to view information of equal detail or accuracy. A service at the user's place of employment may learn that the user is "At work—Having lunch", whereas others might only see that the user is "At work". Similarly, a service station may receive information that the user is "On the way home—in car" so that the service station can send a fueling offer to the user's mobile station. Numerous such uses and applications can be implemented by utilizing the advantageous availability of operating mode data in accordance with the invention. With specific reference by way of example to FIG. 8, therefore, based on the current operating mode a service provider SP can send an advertisement or a service to the user's terminal MS via the telecommunication server DP (arrows 83 and 84).

The systems and methods described herein thus advantageously enable transmission to a user's terminal of messages focused in accordance with the then-current or active state or status of the user and/or the user's terminal.

While there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same result are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining, storing and utilizing operating mode data of a user terminal in a telecommunication system in which a selected one of a plurality of user terminal operating modes is settable by the user, comprising the steps of:
   selectively changing, by the user, the user terminal operating mode from a first operating mode to a second operating mode of the user terminal;
   transmitting from the user terminal to a telecommunication server of the telecommunication system, via the telecommunication network, information regarding the selective change in user terminal operating mode from the first operating mode to the second operating mode;
   storing, on the telecommunication server, the transmitted information regarding the selective change in user terminal operating mode from the first operating mode to the second operating mode so as to dynamically maintain on the telecommunication server current operating mode data of the user terminal; and
   making available, by the telecommunication server, the current operating mode data of the user terminal for enquiries by other users, such that the current operating mode data is available to a calling party prior to attempting a connection to the user terminal.

2. A method in accordance with claim 1, wherein said step of making available further comprises the step of providing, at the telecommunication server, the current operating mode data of the user terminal in a user-specific form browsable by other users.

3. A method in accordance with claim 2, wherein the user-specific form browsable by other users is divided into plural visibility levels.

4. A method in accordance with claim 2 in which a connection to the user terminal is to be established by a calling party, further comprising the steps of:
   checking, by the calling party prior to attempting a connection to the user terminal, the browsable current operating mode data provided at the telecommunication server to determine the current operating mode of the user terminal; and
   after said checking of the current operating mode data, determining by the calling party whether to establish a connection to the user terminal.

5. A method in accordance with claim 2, further comprising the step of limiting the other users by which the current operating mode data of the user terminal is browsable.

6. A method in accordance with claim 1, wherein said step of making available further comprises the step of delivering, from the telecommunication server to other users, the current operating mode data of the user terminal in a user-specific form browsable by the other users.

7. A method in accordance with claim 6, further comprising the step of limiting the other users to which the current operating mode data of the user terminal is delivered from the telecommunication server.

8. A method in accordance with claim 1, wherein said step of storing on the telecommunication server further comprises storing on the telecommunication server at least one of an identity of the user, an identity of the user terminal, an other terminal through which the user can be reached at an other time, terminal setting data for reaching the user, a type of telecommunication connection available for reaching the user, an IP address of the user terminal, and location data of the user terminal.

9. A method in accordance with claim 1, wherein said step of transmitting comprises automatically transmitting from the user terminal to a telecommunication server of the telecommunication system, via the telecommunication network and without other action by the user, information regarding the selective change in user terminal operating mode from the first operating mode to the second operating mode when the operating mode of the user terminal is selectively changed by the user.

10. A method in accordance with claim 1, wherein said step of transmitting comprises manually, by the user, transmitting from the user terminal to a telecommunication server of the telecommunication system, via the telecommunication network, information regarding the selective change in user terminal operating mode from the first operating mode to the second operating mode.

11. A method in accordance with claim 1, further comprising the steps of:
   sending, from the telecommunication server to the user terminal, in response to receipt by the telecommunication server of the information regarding the selective change in user terminal operating mode from the first operating mode to the second operating mode, and based on said received information, data relating to modifications to an operating environment of the user terminal; and
   modifying the user terminal operating environment for consistency with the operating environment modification data received by the user terminal from the telecommunication server.

12. A method in accordance with claim 11, further comprising the step of modifying one of applications and a user interface of the user terminal in accordance with the modification data received by the user terminal from the telecommunication server.

13. A method in accordance with claim 1, further comprising the step of utilizing the user terminal current operating mode data for directing one of advertising and services to the user terminal.

14. A method in accordance with claim 1, further comprising the steps of:
   transmitting in conjunction with the information regarding the selective change in user terminal operating mode from the first operating mode to the second operating mode, from the user terminal to the telecommunication server via the telecommunication network, identity data identifying one of the user and the user terminal;
   altering, in the telecommunication server based on the received identity data, a user reachability chain associated with user reachability management for consistency with the transmitted information regarding the selective change in user terminal operating mode; and
   modifying call control for the user in accordance with the altered user reachability chain.

15. A method in accordance with claim 14, wherein the user reachability chain is defined in a user-specific reachability profile.

16. A method in accordance with claim 15, wherein the user-specific reachability profile is changeable via remote telecommunications access from the user terminal using a WWW user interface.

17. A method in accordance with claim 1, wherein the user terminal is mobile station of the user.

18. A method in accordance with claim 1, wherein the information regarding the selective change in user terminal operating mode from the first operating mode to the second operating mode is transmitted from the user terminal to the telecommunication server as one of an SMS message and a WAP message.

19. A system for determining, storing and utilizing operating mode data of a terminal in a telecommunication system, comprising:
   a telecommunication server in a telecommunication network; and
   a user terminal operable for communicating with the telecommunication network, for allowing a user to selectively change a user terminal operating mode from a first operating mode to a second operating mode of the user terminal, and for transmitting to the telecommunication server through the telecommunication network, information indicating the selective change in the user terminal operating mode from the first operating mode to the second operating mode; and
   the telecommunication server connected to the telecommunication network being configured for dynamically maintaining current operating mode data of the user terminal, for storing the transmitted information indicating the selective change in the user terminal operating mode from the first operating mode to the second operating mode to dynamically maintain on the telecommunication server current operating mode data of the user terminal, and for making available the current operating mode of the user terminal for enquiries by other users, such that the current operating mode data of the user terminal is available to a calling party prior to attempting a connection to the user terminal.

20. A system in accordance with claim 19, further comprising at least one memorandum containing information relating to at least one of terminals connected to the telecommunication network and users of the connected terminals.

21. A system in accordance with claim 19, further comprising an application server connected to the telecommunication server for storing settings of applications and operations associated with different operating modes of the user terminal and for transmitting, to the user terminal, applications and operations settings required by the terminal for each of the different operating modes of the user terminal.

22. A system in accordance with claim 19, wherein said telecommunication server comprises at least one user-specific reachability profile defining a reachability chain.

23. A system in accordance with claim 22, further comprising a call control system connected to the telecommunication server for controlling call setup in accordance with a selected reachability chain.

24. A system in accordance with claim 23, wherein said call control system comprises an intelligent network.

25. A system in accordance with claim 19, wherein said user terminal comprises a mobile station.

26. A system in accordance with claim 19, wherein the user terminal operating mode indicates a state of reachability of the terminal.

* * * * *